United States Patent [19]

Cooper et al.

[11] Patent Number: 5,729,199
[45] Date of Patent: Mar. 17, 1998

[54] SECURITY SYSTEM FOR A METALLIC ENCLOSURE

[75] Inventors: Michael N. Cooper, Hewlett, N.Y.; Erik Hoffer, Somerset, N.J.

[73] Assignee: Consolidated Graphic Materials, Inc., N.J.

[21] Appl. No.: 656,932

[22] Filed: Jun. 6, 1996

[51] Int. Cl.$^6$ .................................................. G08B 13/00
[52] U.S. Cl. .......................... 340/541; 340/545; 340/426; 340/539; 364/423.098
[58] Field of Search ..................................... 340/541, 545, 340/426, 691, 539; 341/176; 364/423.098

[56] References Cited

U.S. PATENT DOCUMENTS

| | | | |
|---|---|---|---|
| 3,618,067 | 11/1971 | DeVale et al. | 340/518 |
| 3,665,312 | 5/1972 | Jarvis | 340/426 X |
| 3,893,069 | 7/1975 | Mason | 340/539 X |
| 3,961,323 | 6/1976 | Hartkorn | 340/539 X |
| 4,562,664 | 1/1986 | Kambic | 49/14 |
| 4,686,792 | 8/1987 | Terrian | 49/61 |
| 4,908,629 | 3/1990 | Apsell et al. | 342/457 |
| 4,924,206 | 5/1990 | Ayers | 340/539 X |
| 5,001,461 | 3/1991 | Vroom et al. | 340/572 |
| 5,126,719 | 6/1992 | DeSorbo | 340/571 |
| 5,187,381 | 2/1993 | Iwasa et al. | 307/10.1 |
| 5,223,844 | 6/1993 | Mansell et al. | 342/357 |
| 5,226,256 | 7/1993 | Fries et al. | 49/13 |
| 5,247,279 | 9/1993 | Sato | 340/426 |
| 5,319,698 | 6/1994 | Glidewell et al. | 379/39 |
| 5,327,118 | 7/1994 | Drucker et al. | 340/572 |
| 5,406,261 | 4/1995 | Glenn | 340/571 |
| 5,543,776 | 8/1996 | L'Esperance et al. | 340/426 |
| 5,570,079 | 10/1996 | Dockery | 340/539 X |

OTHER PUBLICATIONS

Chapter 9: Potential Use of Spread Spectrum Techniques in Non–Government Applications, Walter C. Scales, The MITRE Corporation, Dec. 1980, 58 pages.

"Cutting Edge RF/ID" —IDSystems, Jul. 1995, p. 52.

Qualcomm, Inc., OmniTRAC Division, brochures: "The Very Latest in Security Technology . . . Mobile Communications Technology for Increased Cargo Security"—Thomas Doyle.

VIS OMNITRACS Vehicle Information Systems.

QDSS The QUALCOMM Decision Support System.

QTRACS Your Software Link To The OMNITRACS System.

Qualcomm, Inc., OmniTRAC Division, brochures (cont'd): OmniTRACS The Complete Satellite System.

OMNITRACS Two–Way Satellite–Based Mobile Communications Corporate Overview.

*Primary Examiner*—Jeffery Hofsass
*Assistant Examiner*—Anh La
*Attorney, Agent, or Firm*—Harold James, Esq.; Robert L. Epstein, Esq.; James & Franklin

[57] ABSTRACT

A system for monitoring the occurrence of an event occurring with respect to an essentially metallic enclosure such as a truck body, e.g., the unwarranted opening of a locked door to the enclosure, which comprises a detector within the enclosure which senses the occurrence of the event and radiates a spread spectrum signal which is readily received by an external module mobile relative to the enclosure, so that the enclosure, at any time during its active life, may be externally interrogated to ascertain whether any such event has occurred, the enclosure optionally also containing a separate unit which records the spread spectrum signals for subsequent display and analysis, whereby the security status of the enclosure may be externally monitored at will, thereby to indicate whether or not the enclosure has been tampered with and, optionally, its security history—when and how frequently the event has occurred—may be retrieved.

11 Claims, 2 Drawing Sheets

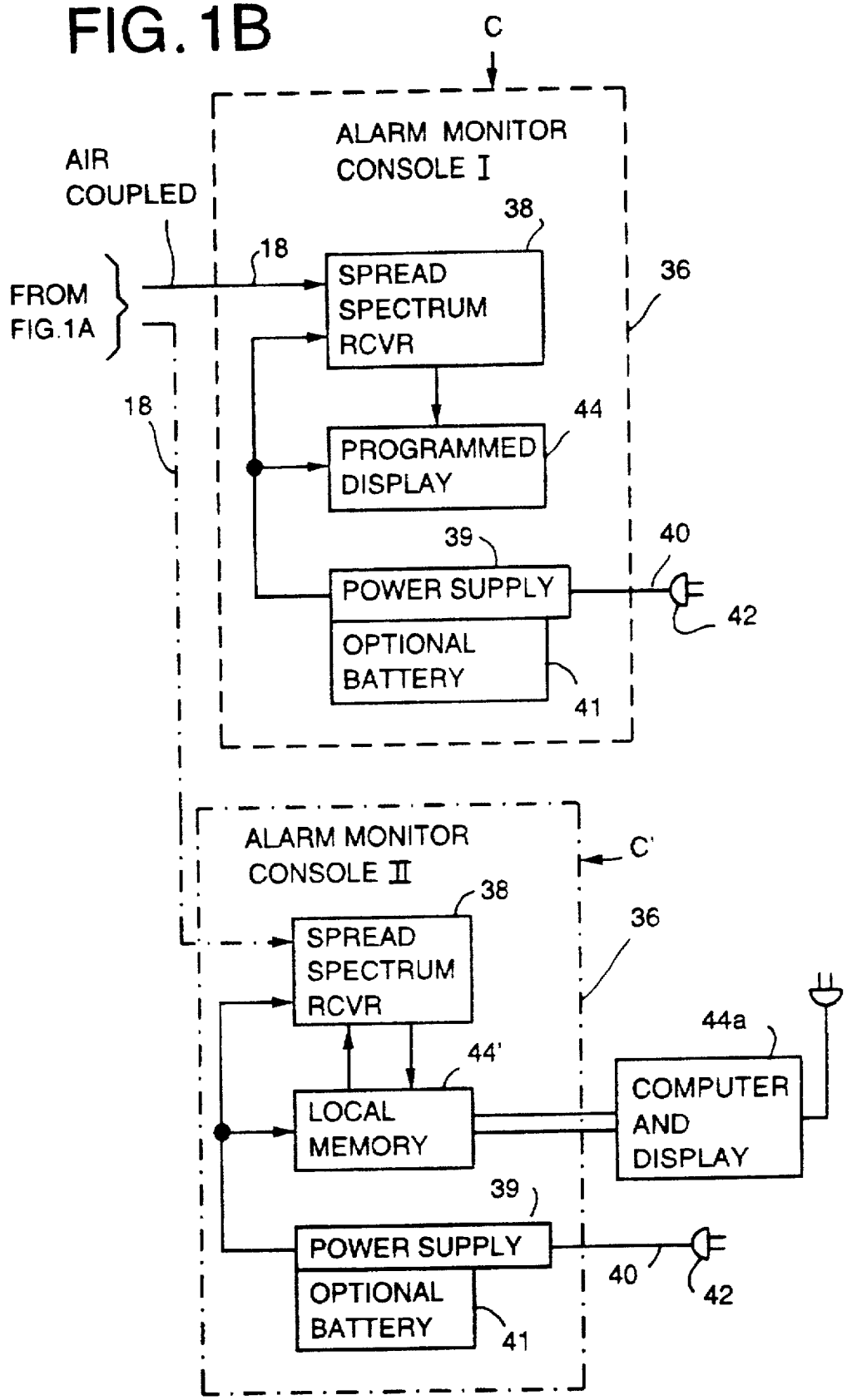

SECURITY SYSTEM FOR A METALLIC ENCLOSURE

BACKGROUND OF THE INVENTION

It is common for merchandise to be transported over long distances, often with many intervening stops, and tampering with or outright theft of the merchandise is all too common. The merchandise transported is often within enclosures such as the bodies of trucks and trailers, those bodies being metallic for structural as well as security reasons. It is important to the recipient or custodian of such merchandise that he know at the time of receipt or inspection that the merchandise has not been tampered with en route, so that he will know whether to accept or reject the merchandise, and a skilled thief will ply his trade sufficiently adeptly so that the theft will not be apparent either from external or internal observation of the enclosure. It is therefore important that means be provided to advise the recipient whether any untoward incident has occurred. Access to the merchandise by breaking through the metallic enclosure is not only difficult but also self-defeating since damage to the body of the truck or trailer would be immediately apparent. Much more common is surreptitiously entering the enclosure by opening its door or cover (hereinafter "door") and then, after the theft has been accomplished, closing the door and restoring such locks or seals as may have been provided. An effective security system, such as the one here disclosed, will reveal whether any such unauthorized entry has been accomplished and therefore alert the appropriate authorities that something is amiss. Since unauthorized door opening is the most common event accompanying vandalism or theft, the system of the present invention will be here described as revealing the occurrence of such an unauthorized door opening, simply by way of exemplification, but the system can, through the use of an appropriately designed detector, advise as to the occurrence of any other predetermined event, e.g., excessive or inadequate temperature, noxious emanations, or the like.

It is important that the system be capable of use with a large number of shipments, since a given merchandise receiving station will usually have a large number of such shipments on hand at any given time with which the inspecting personnel must be prepared to deal effectively and efficiently, and with relatively standardized equipment. Hence the system must be capable of permitting identification of the particular shipment under examination.

It is another important feature of any truly successful security system that it be as unobtrusive as possible so as not to attract the attention of the thief, who would otherwise be tempted to try to disable or fool the system. Hence the existence of readily visible external antennas, thought to be required when radiation from metallic enclosures is involved, and/or exposed wiring, are drawbacks previously tolerated as a presumed necessity. The present system, however, functions well without such drawbacks.

SUMMARY OF THE INVENTION

While the security system of the present invention is adaptable to use with many types of shipments in metallic enclosures, it will be here specifically disclosed in connection with monitoring long distance shipment of merchandise in trucks or trailers. When a truck arrives at its ultimate destination where its contents are to be unloaded it generally pulls up to a loading dock, and it is there that the recipient of the merchandise wishes to know at once whether the shipment is secure. That inquiry will occur many times a day as different trucks pull up to the loading dock for unloading. En route the truck may well have made overnight or other stops at locations where a large number of trucks are parked. Inquiry at any one of those locations as to the security of each of the parked trucks is desirable. The security system of the present invention meets those requirements by providing in each merchandise-containing enclosure a radio frequency transmitter unit wholly enclosed within that enclosure, the transmitter emitting shipment-status radio signals within the enclosure which are capable of being detected outside the enclosure within a reasonable distance from the enclosure. At each security checking station, be it ultimate loading dock, intermediate parking location or otherwise, a receiver module is provided capable, when in reasonable proximity to the enclosure, of receiving the radiated transmission from each interrogated enclosure and intelligently translating it into an indication of the security status of that enclosure at that time. A single receiver module may be provided at each inspection station movable relative to the trucks and capable of differentiating between the signals emanating from the trucks in the vicinity. For example, the receiver may be fixedly positioned at the loading dock so that as each truck is driven up to the dock the signal emanating from that truck will be received. Alternatively, and particularly applicable to large parking areas, the receiver may be mobile, moved into proximity with one truck after another so as to serially receive the signals radiated from those trucks. Identification of a given signal as coming from a given truck may be accomplished in terms of the amplitude of the received signal, determined by the proximity of the receiver to a given truck and the sensitivity of the receiver. In a more sophisticated system each truck may be assigned an identification number visible on the shipping manifest affixed to the enclosure in some fashion, or made known to the interrogator in some other fashion, the signal radiated from the enclosure including that identification number.

Since most commonly used enclosures are metallic in nature, that has in the past been thought to require the use of external antennas usually with exposed wiring in order for a signal to be effectively detected at any reasonable distance, e.g., 100 feet, from the enclosure, yet such external antennas and exposed wiring are undesirable from other points of view. The security system of the present invention overcomes that problem by utilizing a transmitter wholly inside the metallic enclosure and preferably self-contained, without any vulnerable external wiring, which produces a signal of spread spectrum character, such as is described in the article entitled "Potential Use of Spread Spectrum Techniques in Non-Government Applications", by Walter C. Scales (The MITRE Corporation, December 1980), the contents of which are here incorporated by reference. Through the use of a spread spectrum signal a self-contained and even armored battery-operated transmitter module located within a metallic enclosure will produce a signal that can readily be effectively detected outside that enclosure at distances from the enclosure which render the security system of the present invention usable in normal commercial environments.

The signal transmitted from inside the enclosure may simply indicate whether or not a particular event, such as the opening of a door to the enclosure, has occurred. Preferably such a simple signal will take two forms, one representing a satisfactory condition and the other indicating that something is wrong. The receiver module, when brought into proximity with the enclosure in question, will recognize the signal and give an appropriate indication. Preferably the receiver module will also give an indication that something is amiss if no signal at all is received from the enclosure in question, since the absence of a signal might indicate that an individual who broke into the enclosure has rendered the transmitter ineffective. It is preferred that each enclosure transmit its signals periodically, although at a relatively low frequency of repetition in order to conserve power, so that an inspector need not send a signal of interrogation, and it is further preferred that when the security system determines that something is amiss the frequency of repetition of the appropriate signal be increased. This is particularly advantageous when the transmitter is battery-operated, since there will then be a small battery drain during normal operation but a more effective transmission of an alarm signal although at the cost of greater energy consumption.

In a more sophisticated version the system may effectively take into account the numerous door openings which normally occur and distinguish them from an unauthorized door opening. To that end the system, after once being enabled, will count the number of times that the door has been opened and will generate a signal indicating that count which the receiver module, when it receives the signal, will display. The inspector, the person operating the receiver module, will be informed in some appropriate fashion of the proper number of door openings, and if the displayed number differs from that proper number that will reveal that an unauthorized door opening has occured. Thus the system will accommodate itself to quite proper door openings at different points in the travel of the enclosure, while still functioning to provide an indication of security breach.

It is also advantageous to provide within the enclosure a second preferably self-contained receiver module separate from the transmitter and linked to it only by radiation from the transmitter module, which receiver module controls a recorder which provides a relatively permanent record of all signal events, which record can, at an appropriate time, be read out so that the total history of the shipment can be ascertained when desired.

It is therefore the prime object of the present invention to provide a security system which can function within a metallic enclosure, preferably in a self-contained battery-operated mode, which will detect the occurrence of a particular event such as the opening of the enclosure door, and which will radiate a signal which can be effectively detected outside the enclosure, so it can readily be determined from outside the enclosure whether such an event has occurred or not.

It is a further prime object of the present invention for the transmitter within the metallic enclosure to produce a spread spectrum signal so that detection of the signal at a point outside the enclosure is greatly facilitated with minimum power consumption.

It is a further object of the present invention to so modify the produced signal as to enable it to provide relatively detailed intelligence over and above simply indicating whether or not a particular event has occurred.

It is yet another object of the present invention for the system to include means which can provide a readout of the history of the shipment.

To the accomplishment of the above, and to such objects as may hereinafter appear, the present invention relates to a security system for a metallic enclosure as defined in the appended claims and as described in this specification, taken together with the accompanying drawings.

BRIEF DESCRIPTION OF THE DRAWINGS

FIG. 1B is a block diagram of two alternative external receiver module systems, indicated respectively as Alarm Monitor Console I and Alarm Monitor Console II, alternatively usable with the transmitter module of FIG. 1A.

DESCRIPTION OF THE PREFERRED EMBODIMENTS

Figure 1A:
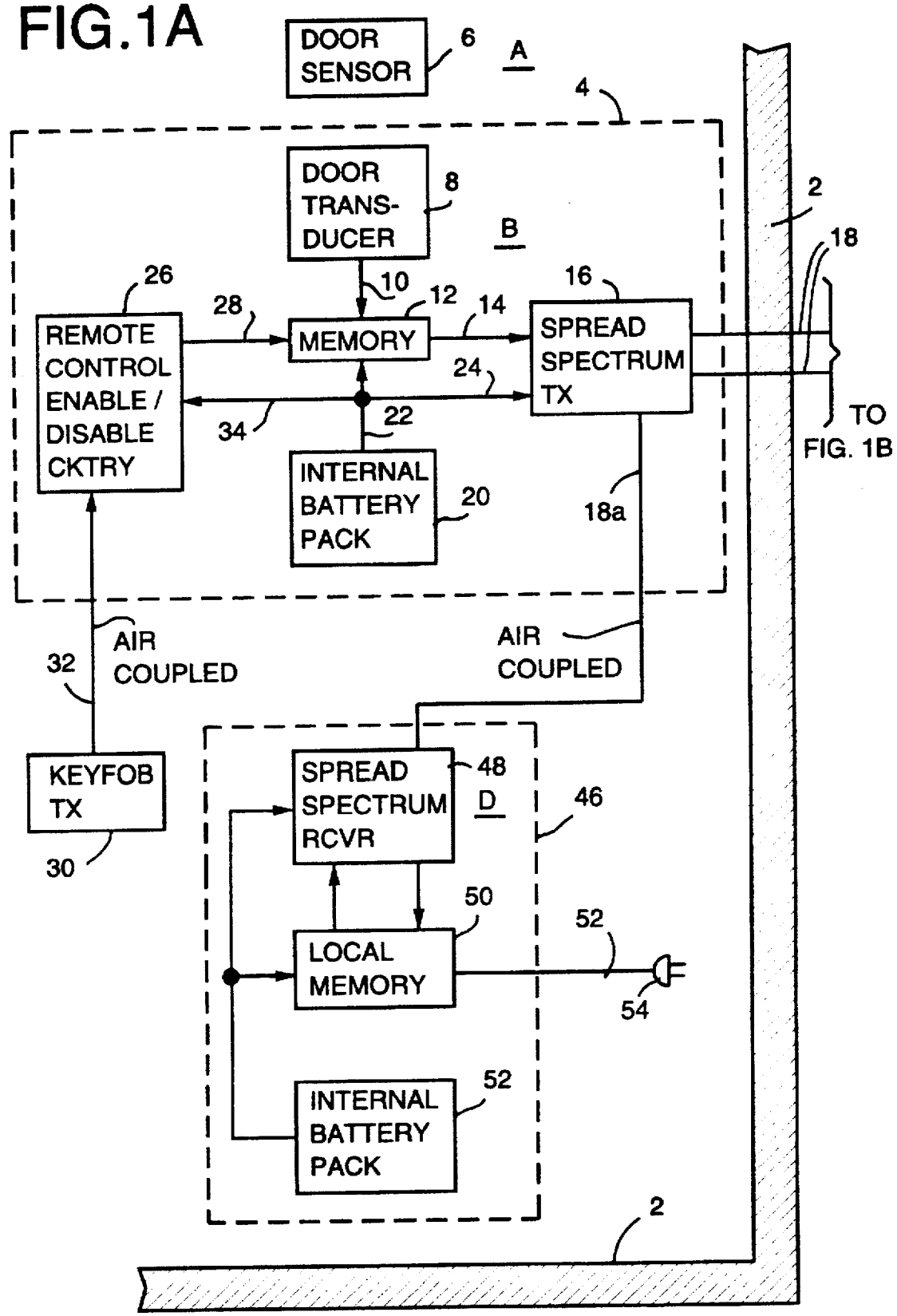
FIG. 1A is a block diagram of that part of one embodiment of the present security system which is within a metallic enclosure including a transmitter module and, optionally, a receiver module.

Since the system of the present invention is particularly well adapted for advising whether the door, hatch or cover (hereinafter "door") of a metallic enclosure such as the body of a truck or trailer has been tampered with, the system will be specifically described in that context, but it will be understood that, depending upon the type of sensors involved, it can advise as to the occurrence or non-occurrence of many other events of interest, such as whether the contents of the enclosure have been subjected to excessive or insufficient temperature, whether noxious fumes or excessive moisture have been present, or the like.

FIG. 1A is a block diagram of that portion of the system of the present invention designed to be mounted within a metallic enclosure such as a truck body, the interior thereof being represented generally by the letter A and some of the walls of that body defining the metallic enclosure being designated by the reference numeral 2. The thus enclosed space A will contain not only the merchandise to be transported and delivered, but also a self-contained detector-transmitter module generally designated B shown as enclosed within the dotted line 4, representing the housing, which may be strong metal. The enclosure A is provided with a door or cover ("door"), not shown, which is opened whenever merchandise is put into the enclosure A or removed therefrom. Associated with that door is a door sensor 6 which senses whether the door is open or closed. Such sensors are well known and may take many forms. Door sensor 6 is associated with the enclosure 2 and is outside the transmitting module B, but it is operatively active on a door transducer 8 located either inside or outside the transmitter module B. For example, the door sensor 6 may be a magnet or a piece of metal attached to and movable with the door, and the door transducer 8 may be a unit such as a reed switch which is sensitive to the location of that magnet or piece of metal, which may be located inside the housing 4 close to the transducer 8 when the door is closed and remote therefrom when the door is open, thus causing a change in the electrical status of the transducer 8. There is therefore no external wiring. Also forming a part of the transmitter module B and operatively connected to the door transducer, as indicated by the arrow 10, is a memory unit 12 which, in response to the electrical status of the transducer 8, affects, as indicated by the arrow 14, a radio frequency transmitter 16, causing that transmitter 16 to produce a signal 18 of a character or nature depending upon whether the enclosure door has been opened or not. Preferably the radio frequency signal 18 emanating from the transmitter 16, indicated by the lines 18 in the drawings, will in its simplest form be different if the door has remained closed from what it is if the door has been opened, the memory 12 preferably ensuring in such a situation that once the door has been opened the signal emanating from the transmitter 16 will not only change to its door-opened status but remain in that status (latching). Preferably the transmitting module B is self-contained, including an internal battery pack 20 which, as indicated by the lines 22 and 24, energizes both the memory 12 and the transmitter 16.

Means are preferably provided to permit enabling and disabling of the transmitter module B from outside its container 4. That is indicated by the remote control enable/disable circuitry block 26, and its electrical connection to the remainder of the circuitry is indicated by the line 28. The enable/disable circuitry 26 may be actuated by a switch such as a push button accessible at the exterior of the enclosure 4 for the transmitting module B, but it may also be actuated by a remote keyfob transmitter 30 which is air-coupled to the circuitry 26 as indicated by line 32. Such keyfob transmitters are today quite common for the remote actuation of garage doors, automobile locking systems and the like. The circuitry 26 may be energized from the internal battery pack 20, as indicated by the line 34.

In order to conserve the life of the battery pack 20 the memory 12 is effective to cause the transmitter 16 to send out a signal only intermittently. The less frequently the signal is transmitted the longer will be the life of the battery pack 20. It is contemplated, for example, that a signal be transmitted once a minute under normal circumstances, or even once an hour under exceptional circumstances. However, if there has been an unauthorized opening of the enclosure door, making it desirable that an alarm be given and understood with certainty and as promptly as possible, the unauthorized opening of that door, as detected by the sensor 6 and transducer 8, will, through the memory 12, not only cause the radiated signal to indicate that the door has been opened but will also cause that signal to be sent more frequently, e.g., every 10 seconds.

Each truck enclosure A will be provided with a transmitter unit B. Each location where the status of the shipment is to be checked (e.g., each loading dock or parking lot) may be provided with a single receiver module generally designated C or C' (see FIG. 1B; receiver modules C and C' are alternate embodiments). The receiver module C comprises an enclosure 36 within which is a radio signal receiver 38 capable of detecting the airborne signals 18 radiated from the transmitter 16 within an adjacent truck. The receiver module C has a power supply 39 which may be self-contained and provided with an internal battery 41, but it need not be so, but may be connectable to some external source of power through line 40 and plug 42, that external source of power conveniently being an ordinary power socket when the receiver C is located at a loading dock and therefore need not be moved over any great distance, or, for example, being the power circuit of an automobile where the receiver C is located within that automobile so as to be conveniently movable into proximity with widely separated trucks at a truck parking lot.

In use, the receiver module C will be brought into relatively close proximity (30–100 feet and preferably less than 50 feet) to a given truck which is to be checked. It will receive a signal 18 and then, on its programmed display 44, indicate the nature of the signal received, thus advising the user of the receiver module C whether the truck door had been opened or not depending upon the nature of the received signal.

The transmitter module B is designed to be relatively unobtrusive within the enclosure A, there are no external antennas or wiring to advertise the fact that the truck is being monitored, and hence it is relatively unlikely that a thief would be motivated to inactivate the transmitter module B or that he would know how to inactivate it even if he wanted to. However, it is preferred that the programmed display 44 of the receiver C indicate to the operator not only the specific nature of the signal 18 if received but also the non-detection of a signal 18 within a predetermined period such as the one minute frequency previously mentioned. As a result the supervisor will be alerted by the absence of any received signal to the possibility that the shipment has been tampered with.

A given loading platform, and particularly a given parking lot, will normally have a number of trucks in position at any one time. The operator of the receiving module C must distinguish between those trucks so as to know from which truck a particular signal 18 emanates. In its simplest form this can readily be done by controlling the sensitivity of the receiver 38 corresponding to the distance of the receiver module C from the particular truck of interest. If there is interference between the signals 18 emanating from two adjacent trucks the receiver module C will be moved close enough to the truck of interest so that its signal 18 is the only one that is operatively detected.

A more sophisticated signal identification arrangement is to have the signal itself identify the truck from which it emanates. Thus the signal can include an introductory series of numbers identifying that particular truck, and that identification number will be made known to the operator of the receiver module C, as by listing it on the manifest which accompanied the shipment or which preceded it to its destination or by imprinting it on tags, labels or seals externally visually accessible on the truck, or it can be the first few numbers of the truck's license plate. In such a case the receiver module C can either be preset by the user to receive only signals starting with the proper identification numbers or can display the identification numbers on the display 44 so that the user can visually compare them with the identification number that has been otherwise provided.

One problem involved in operating a system of the type under discussion is that the signal 18 generated by the transmitter 16 must pass through a metallic wall 2 of the enclosure A, and probably also the metallic wall of the module 4 itself, before it can be detected by the receiver 38, and the attenuating effect of the metallic walls is generally so great on radio signals passing through them as either to make it very difficult to reliably intercept and make sense of those signals outside the enclosure A or requiring an excessively powerful transmitter 16, with consequent excessively large power consumption, thus greatly reducing the life of the internal battery pack 20. In accordance with the present invention those disadvantages have been eliminated to a very large extent by using a transmitter 16 which produces a signal 18 of spread spectrum character, preferably in the 902–928 MHz range. These are transmissions which require significantly more radio frequency bandwidth than a conventional signal would require. The spread spectrum technique has long been known to provide one or more of the following features: resistance to jamming; resistance to unintentional interference; resistance to unauthorized interception; sharing of a common radio frequency band by multiple users; discrete addressing; accurate distance or location measurements, and pulse compression. None of these characteristics are involved or of importance in connection with the system here disclosed, with the possible, and minor, exception of resistance to interference. The unexpected property of spread spectrum technique which is here utilized to a major degree is that the attenuation of a spread spectrum signal 18 by a metallic wall 2 is considerably less than the attenuation of a more conventional type of signal, as a result of which detection of relatively weak signals 18 that pass through metallic walls 2 may be effectively detected outside the enclosure A at relatively great distances therefrom.

In its simplest form the system, once it has been enabled, will indicate whether or not the truck door has been opened. It often occurs that an authorized opening of the truck door will occur after the system has been enabled, as when, for example, part of the shipment is unloaded at one location and the remainder of the shipment is then transported to a second location. Alternatively, additions to a particular shipment may be made at the point of origin after enablement of the system, thus calling for one or more authorized door openings. To accommodate such activities the memory 12 of the transmitter unit B may, after system enablement, count the number of times that the door has been opened and closed and modify the transmitted signal 18 to indicate that count, and the display 44 in the receiving console C will then display that count. The person operating the receiver module C will in some appropriate manner be advised as to the proper number of legitimate door openings that have occurred. For example, that information may be included in the shipping manifest or imprinted on tags or labels externally accessible on the enclosure A. Each time that there is an authorized door opening the door opening number will be updated and that intelligence will be made available to the interrogator.

The memory 44' of receiver module C' may be capable of comparing the received identification and count signals, either in real time or subsequently, with the corresponding data otherwise provided, and the receiver module C may contain a similar memory which controls the display 44.

FIG. 1B discloses two alternative embodiments of the alarm monitor console C and C'. They differ in that the console C itself includes a programmed display 44, whereas the console C' is provided with a local memory 44' which in turn is connected or connectable to an external computer and display unit 44a.

There may come a time in the course of supervising the security status of a shipment when a long-term and comprehensive history of that shipment is desired. For example, one may wish to ascertain when, and therefore where, a particular unauthorized door opening occurred. To that end, and as shown in FIG. 1A, the enclosure A may contain a separate self-contained module D comprising, within a secure box 46 or the like, a spread spectrum receiver 48 which is air-coupled, as indicated by the line 18a, to the spread spectrum transmitter 16 so as to receive the signal 18 emanating therefrom. The receiver 48 is operatively connected to a memory unit 50, and both units 48 and 50 are powered by an internal battery pack 52. The memory 50 is also preferably provided with date and time sensing means, so that what is memorized comprises the signals 18 emanating from the transmitter 16 identified as to their time of occurrence. When review of the history of that shipment is desired, the unit D is removed from the truck and the memory 50 is connected, as indicated by line 52 and plug 54, to any appropriate readout device, such as the computer and display 44 shown in FIG. 1B. The memory 50 and receiver 48 may be non-continuously energized in order to extend the life of the internal battery 52. For example, it might be energized for 24 seconds and de-energized for 8 minutes. In such a case a transmitter signal 18 which includes the count of door openings is most desirable, so that the memory 50 will not miss anything that may have occurred during its period of de-energization.

The self-contained transmitter unit B and, when provided, the self-contained receiver unit D are preferably in the form of "black boxes", unobtrusive packages giving no external indication of their function, which can be unobtrusively placed within the truck body so that an intruder will most likely not be aware of their existence, much less know how to disable them or prevent them from indicating that an intrusion has taken place.

The system of the present invention may be used as follows: After loading of a particular truck enclosure A has been completed and its door closed and sealed the transmitter module B will be enabled. At way stations and at the final destination a receiving module C will be brought into relatively close proximity to the truck and the operator will wait for a predetermined period of time corresponding to the frequency of transmission of the signal 18 to determine whether a signal is received and, if so, what its nature is. From this the operator will be able to determine whether there has been an unauthorized opening of the truck. In a more sophisticated system the transmitting module B will count the number of times that the truck door has been opened and closed and will in its signal 18 indicate what that number may be, so that the operator of the receiving module C, being otherwise informed as to the number of authorized door openings and closings, can interpret the signal to determine whether or not there has been an unauthorized door opening. This involves precise knowledge of the identity of the truck whose signal is being received. This identification can be made empirically through correlation of the strength of the received signal and the distance of the receiving module C from the truck, or the signal 18 may itself contain identification of the particular truck from which it emanates, which identification is made known by receiver module C or its associated equipment. Through the use of signals 18 of the spread spectrum type, completely self-contained modules B and receiving modules D may be employed, even encased in metal for security purposes, yet signals readily receivable outside the enclosure A may be produced with a minimum of power consumption, thus extending the life of the battery pack 20 and improving the reliability of the system. Power consumption from the battery pack 20 is further minimized by having the transmitter 16 radiate a signal only intermittently, it being preferred that when the system detects an unauthorized door opening the frequency of repetition of the signal be increased, thereby in and of itself unmistakably indicating that there has been a tampering. Means may also be provided, unobtrusively located within the truck body, for recapturing the entire security history of a given shipment without detracting from the other advantages of the system, from which that history can be downloaded.

While a limited number of embodiments of the present invention have been here disclosed, it will be apparent that many variations may be made therein, all within the scope of the invention as defined in the following claims.

We claim:

1. A system for monitoring the occurrence of an event occurring with respect to an essentially metallic enclosure and adversely affecting the security of said enclosure which comprises means for detecting the occurrence of said event, means within said enclosure operatively connected to said detector means for producing a radiation signal of the spread spectrum type indicative of the occurrence and/or non-occurrence of said event, and means outside said enclosure for receiving said signal through the air and providing an indication in the event that the status of said signal reveals that the security of said enclosure is in question.

2. The system of claim 1, in which said signal receiving means provides an indication if (a) said signal reveals that said event has occurred, or (b) if no effective signal is received.

3. In the system of either of claims 1 or 2, means within said enclosure separate from said signal producing means for receiving said signal through the air and recording data corresponding to said signal for subsequent recapture.

4. The system of either of claims 1 or 2, in which said signal includes an indication of the number of times said event has occurred and in which said means outside said enclosure produces a sensible output identifying said number.

5. In a system of claim 4, means within said enclosure separate from said signal producing means for receiving said signal through the air and recording data corresponding to said signal for subsequent recapture.

6. The system of either of claims 1 or 2, in which said signal includes identification of the time of day when said event has occurred, and in which said means outside said enclosure produces a sensible output identifying said time of day.

7. The system of claim 1, in which said signal producing means produces a sensible signal every predetermined period of time whether said event has occurred or not, the signal differing depending upon whether said event has occurred or not.

8. The system of claim 7, in which said predetermined period of time is of a given magnitude when said event has not occurred and a lesser magnitude when said event has occurred.

9. The system of either of claims 7 or 8, in which said signal includes an indication of the number of times said event has occurred and in which said means outside said enclosure produces a sensible output identifying said number.

10. The system of either of claims 1 or 2, in which said spread spectrum radiation band is between about 902 and 928 MHz.

11. A system of claim 10, in which said signal producing means produces a sensible signal every predetermined period of time whether said event has occurred or not, the signal differing depending upon whether said event has occurred or not.

* * * * *